April 7, 1936.                L. E. DUPUY                2,036,863
                        CONVEYER MECHANISM
                        Filed Oct. 1, 1932                3 Sheets-Sheet 1
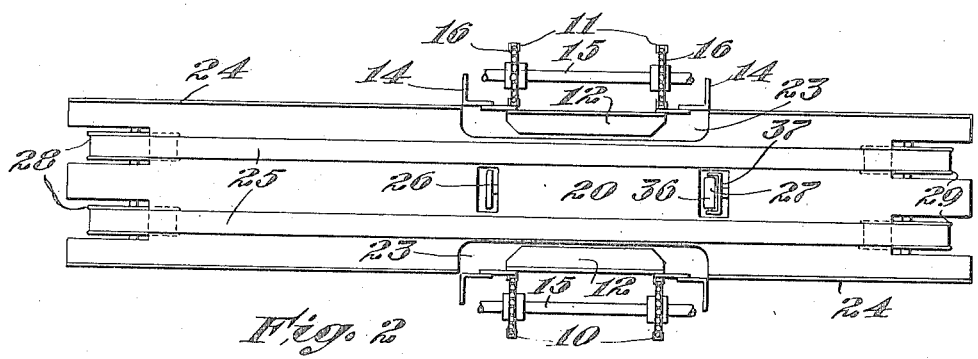
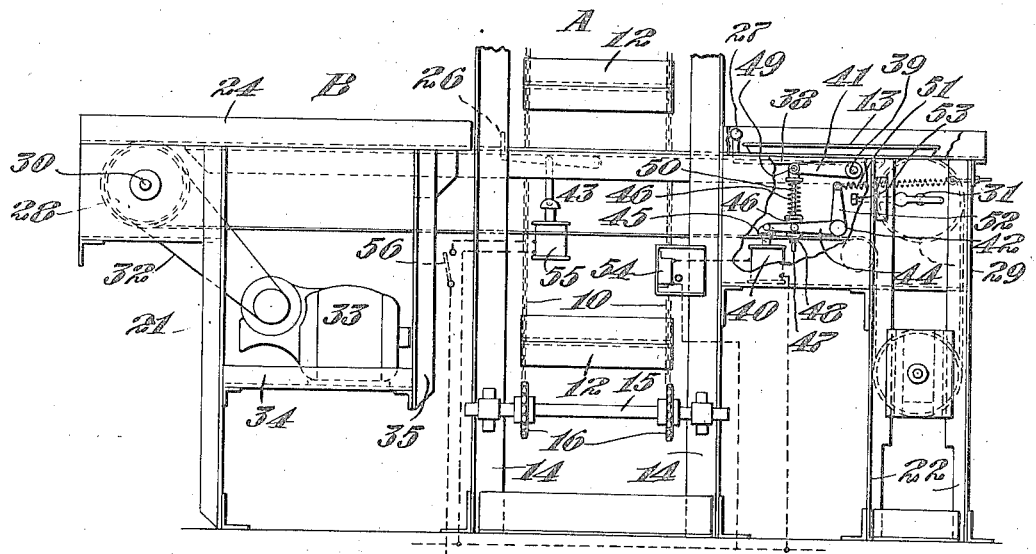
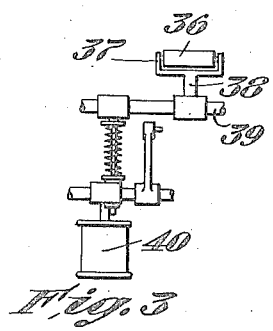
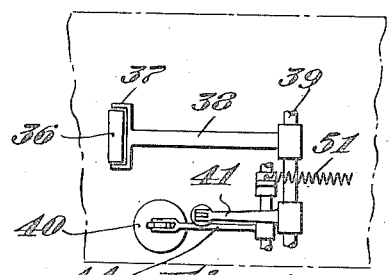

April 7, 1936. L. E. DUPUY 2,036,863
CONVEYER MECHANISM
Filed Oct. 1, 1932 3 Sheets-Sheet 2

Inventor
Louis E. Dupuy
by Robert Duchmann Woodbury
Attys.

April 7, 1936. L. E. DUPUY 2,036,863
CONVEYER MECHANISM
Filed Oct. 1, 1932 3 Sheets-Sheet 3

Inventor
Louis E. Dupuy
by Roberts, Cushman & Woodbury
Attys.

Patented Apr. 7, 1936

2,036,863

UNITED STATES PATENT OFFICE 2,036,863

CONVEYER MECHANISM

Louis E. Dupuy, Syracuse, N. Y., assignor to The Lamson Company, Syracuse, N. Y., a corporation of Massachusetts Application October 1, 1932, Serial No. 635,786

2 Claims. (Cl. 198—26)

This invention relates to an improvement in conveyer mechanism and more particularly to a station installation including an auxiliary conveyer by which articles are fed to and removed from a main conveyer, such auxiliary conveyer including stop mechanism by which the movement of the articles is controlled and regulated.

For the purpose of showing this invention I have elected to disclose and describe one genus thereof comprising an auxiliary conveyer so constructed and arranged that trays are loaded or unloaded from a main reversible vertical conveyer of the well known flight type; the loading operation taking place during the upward travel of the conveyer and the unloading operation taking place during downward travel thereof.

The primary object of this invention is to provide in conjunction with the article transporting means of the auxiliary conveyer a stop mechanism including a stop member which is yieldably advanced into the path of travel of the trays and positively withdrawn therefrom by means controlled automatically by the main conveyer.

A further object of this invention is to provide in conjunction with such stop mechanism a pair of conveyer belts one at each side of the stop member, which belts are continuously driven to hold the first of the articles to be loaded onto the main conveyer in contact with the stop member.

Other objects of this invention will appear from a consideration of the following description of the elected genus and of the drawings which form a part thereof and in which, Fig. 1 is a side elevation;

Fig. 2 is a plan view of a station installation provided with one embodiment of the invention;

Figs. 3 and 4 are views illustrating on a larger scale such stop mechanism;

Figure 6:
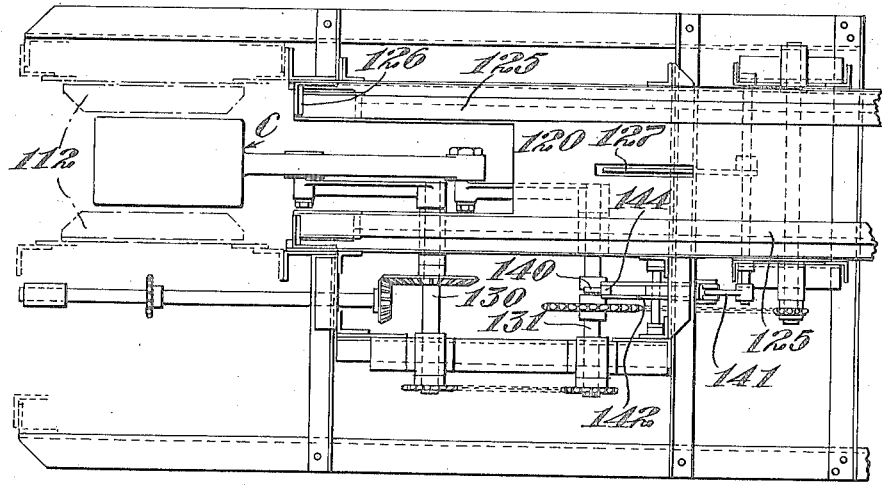
Figs. 5 and 6 are views similar to Figs. 1 and 2 of a station installation provided with stop mechanism embodying another form of the invention.

As shown in Figs. 1 to 4 inclusive trays are fed to and removed from a main conveyer A by an auxiliary conveyer B. The main conveyer A comprises two pairs of chains 10 and 11 to which are secured flights 12 in the usual way so that each pair of flights coact to support a tray 13. The flights and chains travel in a well defined by upright angle bars 14 which also act to support the shafts 15. Mounted on the shafts 15 are the sprockets for the chains and while only the foot sprockets 16 are here shown, it will be understood that the main conveyer also includes head sprockets.

The station here shown comprises a platform 20 supported upon uprights 21 and 22 and provided with notches 23 through which the flights 12 travel freely, as shown in Fig. 2. The trays 13 are caused to travel over the platform 20 between guide walls 24 by the auxiliary conveyer here shown as comprising parallel belts 25 and stop members 26 and 27. The belts are passed over end pulleys 28 and 29 carried by shafts 30 and 31 respectively. The shaft 30 is here shown driven through a belt 32 by a motor 33 supported upon a platform 34 carried by the uprights 21 and angle bars 35 depending from the platform 20.

The stop member 27 comprises a roller 36 carried by a yoke 37 at one end of an arm 38 supported at its other end upon a rock shaft 39 to which it is secured by any suitable means. The rock shaft is moved counterclockwise to depress the stop by means of a solenoid 40 through an arm 41 fixed on the shaft 39 and a lever 42 connected to one end of the arm by a link 43. One leg 44 of the lever is pivotally connected to the core 45 of the solenoid and to it is pivotally secured a sleeve 46 in which a pin 47 of the link 43 reciprocates freely. The upward movement of the pin is limited by a nut 48 at the lower end of the pin which contacts with the sleeve 46. The pin 47 terminates in a head 49 pivotally connected to the arm 41 and an expansion spring 50 surrounding the pin 47 bears at its ends against the sleeve 46 and the head 49 to hold the sleeve 46 and nut 48 in contact. A contraction spring 51 attached at one end to the other leg 52 of the lever 42 and at the other end to an upright 22 coacts with the spring 50 to hold the stop mechanism in the normal position shown in Fig. 1. A limit stop 53 is arranged to engage the leg 52 and prevent the lever under the urge of the spring 51 from traveling too far. When the solenoid 40 is energized by means about to be described, the core 45 is retracted and the lever 42, acting through the link 43 moves the arms 41 and 38 counterclockwise thus depressing the stop member 27 and permitting the tray 13 in contact therewith to be advanced by the belts 25 into contact with the stop member 26 by which it is held in the path of travel of the conveyer flights.

As here shown the solenoid 40 is energized by an electric circuit including a normally open circuit maker 54 which is located in the well and tripped in the usual well known manner by each flight on one pair of chains as it approaches the platform 20 upon its upward travel. While the depression of the stop member 27 is only momentary, it is sufficient to allow the belts 25 to advance the waiting tray over the member, and, since that member is yieldably returned by the action of the springs 50 and 51, the weight of the tray will be sufficient to hold the member depressed until it has passed. The roller 36 reduces to a minimum the frictional resistance of the stop member to this travel of the tray thereover.

The stop member 26 is normally in the functioning position shown in the drawings. When however the flights travel downwardly the stop member is retracted by energizing a solenoid 55 controlled through a switch 56 which is closed when the flights so travel. As each pair of flights passes the platform 20 the tray carried thereby is placed on the belts 25 and carried out of the well over the depressed stop member 26. It will be understood that the flights, when traveling downwardly, will not actuate the circuit maker 54 previously described.

Figure 5:
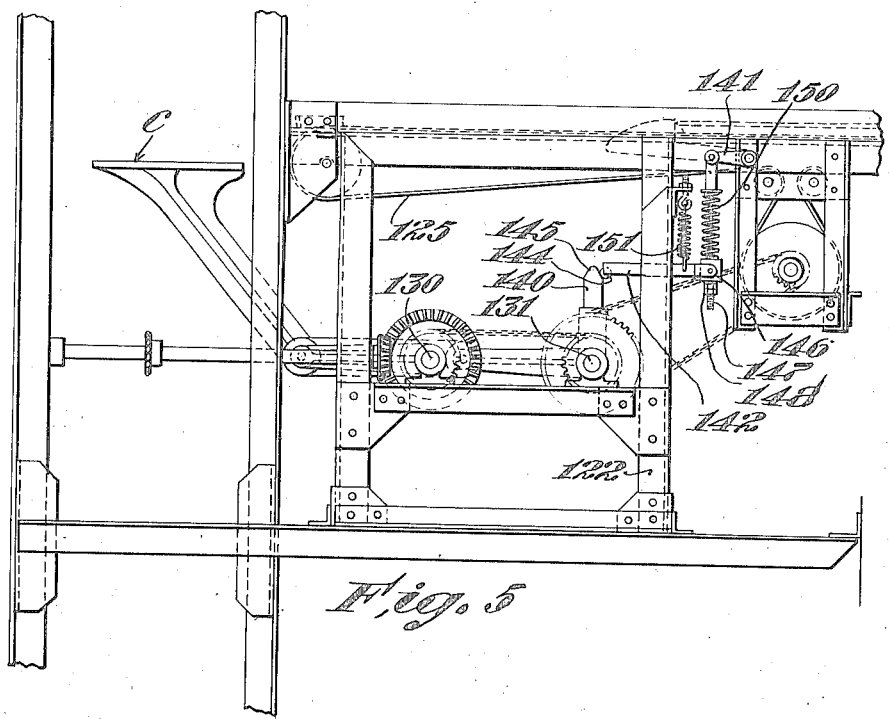
Figure 7:
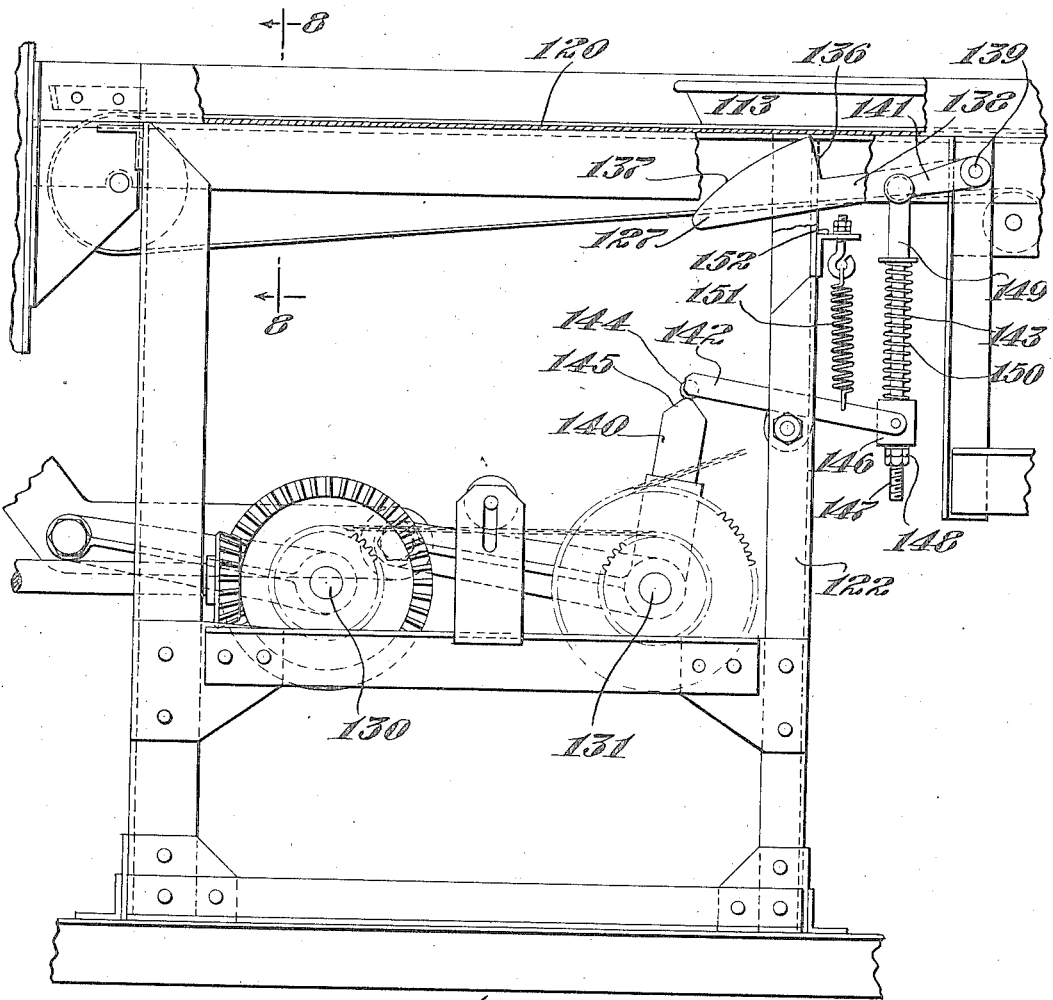
Fig. 7 is an enlarged side elevation showing the stop mechanism in the inoperative position.
Figure 8:
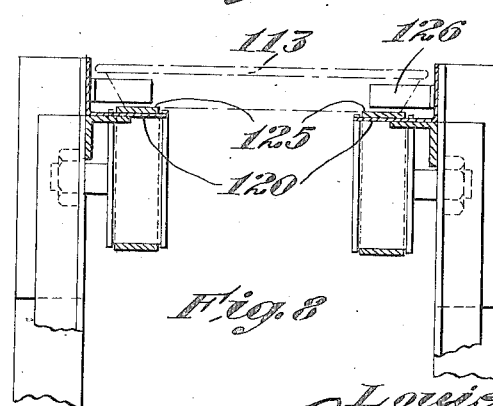
Fig. 8 is a sectional view taken along the line 8—8 of Fig. 7.

Figs. 5, 6, 7 and 8 disclose an embodiment of this invention comprising the combination with a tray transferring structure of the type set forth in Patent No. 1,974,042, granted to me on Sept. 18, 1934, of a modified form of the stop member and mechanism previously described.

In this embodiment trays 113 to be loaded onto the flights 112 of the main conveyer are advanced over a platform 120 by parallel spaced belts 125 and the travel of the trays is controlled by stop members 126 and 127. Each tray stopped by the member 126 is transferred from the platform 120 by an orbitally moving arm C into the well and removed from the arm by the flights 112. The structure and operation of the transfer arm mechanism, as set forth in detail in the above application, form no part of the present invention and hence will not be here described other than to point out that the arm C is actuated by shafts 130 and 131 suitably driven continuously by the mechanism (not shown) which drives the main conveyer.

The stop member 127 comprises an arm 138 fixed upon a rock shaft 139 and having a nose which presents a substantially vertical face 136 to the trays being fed to the main conveyer and convex face 137. The rock shaft 139 is moved counterclockwise at regular intervals to depress the stop member 127 by an arm 140 fixed on the shaft 131 and acting through an arm 141 fixed on the shaft 139 and a bar 142 pivoted intermediate its ends to an upright 122 and connected to one end of the arm 141 by a link 143. One end of the bar 142 extends in the path of travel of the tip 145 of the arm 140 and carries a freely rotatable roller 144 which is tripped by the arm at each rotation of the shaft 131 thus causing the bar 142 to rock on its pivot. Pivotally secured in a yoke at the other end of the bar is a sleeve 146 in which a pin 147 of the link 143 reciprocates freely. Nuts 148 at the lower end of the pin however contact with the sleeve 146 and limit the upward reciprocation of the pin relative to the sleeve. The pin terminates in a head 149 pivotally attached to the end of the arm 141. An expansion spring 150 surrounding the pin and bearing against the sleeve 146 and the head 149 tends to hold the sleeve at all times in contact with the nuts 148. A contraction spring 151 attached at one end to the bar 142 and at the other end to a bracket 152 carried by an upright 122 opposes the action of the spring 150 tending to raise the bar 142 and sleeve 146. The trays placed on the belts 125 at the despatching station (not shown) are advanced thereby between the guide walls 124 until the leading tray contacts with the face 136 of the stop member. As the transfer arm travels through its orbit the arm 140 trips the roller 144 of the bar 142 rocking the bar on its pivot and the latter through the link 143 positively causes the arm 141 to rock the shaft 139 and depress the stop member. The trays then resume their advance but, as soon as the arm 140 passes the roller 144, the stop member under the urge of the springs 150 and 151 tends to return to its normal position. The tray then passing over the stop member however prevents this movement of that member until that tray has passed whereupon the member resumes its normal position and prevents the advance of other trays until the bar 141 is again rocked by the arm 140.

If trays are to be unloaded the direction of travel of the main conveyer, the transfer arm C and the belts 125 is reversed. The stop member 127 is lowered once for each complete revolution of the shaft 131 to permit the advance of the tray just delivered to the belts by the transfer arm. As previously pointed out, the trays are of sufficient weight to oppose the action of the springs 150 and 151 so that any tray passing over the stop member will hold that member depressed until it has passed.

It will be noted that in both the described embodiments the first stop member (27 or 127) is yieldably held in the path of travel of the articles, and is positively withdrawn from the path by mechanism set in operation by the main conveyer mechanism at predetermined intervals in timed relation to the movement of the main conveyer. It will also be noted that the positive withdrawal is for a brief period only and that the return of the stop member to the path is prevented in case an article is at that time passing the stop member, until that article has passed.

When the auxiliary conveyer is employed to load the main conveyer the trays or other articles are fed to the belts of the auxiliary conveyer in any suitable manner. Since the manner of supplying them to the auxiliary conveyer forms no part of the present invention, no such means have been shown. It will be understood however that the feeding may be intermittent or continuous and may be manual or automatic as by the use of suitable conveyer means for example a gravity or a belt conveyer. It will also be understood that in case of a continuous feed the travel of the articles is at a rate of speed lower than that of the auxiliary conveyer belts so that the articles are spaced apart a distance sufficient to allow the stop mechanism to prevent the loading of more than one tray at a time on the flights of the main conveyer.

While the genus of this invention elected to be shown and described is adapted to transfer trays horizontally relative to a vertically traveling conveyer and two embodiments of the stop mechanism have been specially shown and described, it will be understood that my invention is not limited thereby and that other genus of the invention and other embodiments of stop mechanism may be made without departing from the spirit and scope of the invention as set forth in the following claims.

I claim:

1. In a conveyer mechanism, means for advancing articles in a predetermined path, and stop mechanism including a member normally held in such path to prevent the advance of the articles, a rock shaft on which said member is mounted, an arm carried by said shaft, a pivotally mounted element, a link connecting said element and said arm, spring means tending to separate said element and arm and hold said stop member in the path of the articles, and means for tripping said element whereby it acts through said link and said arm to rock said shaft and retract said stop member out of such path.

2. In a conveyer mechanism, means for advancing articles in a predetermined path, and stop mechanism including a member normally held in such path to prevent the advance of the articles, a rock shaft on which said member is mounted, an arm carried by said shaft, a pivotally mounted element, a link connecting said element and said arm, spring means tending to swing said element toward said arm, other spring means tending to separate said element and arm and hold said stop member in the path of the articles, and means for tripping said element whereby it acts through said link and said arm to rock said shaft and retract said stop member out of such path.

LOUIS E. DUPUY.